Nov. 14, 1972   G. B. VENERIA   3,702,750
MACHINE FOR FORMING THERMOPLASTIC RESIN
PARTS BY INJECTION MOULDING
Filed Nov. 13, 1970   6 Sheets-Sheet 4

INVENTOR

BY

ATTORNEY

Nov. 14, 1972   G. B. VENERIA   3,702,750
MACHINE FOR FORMING THERMOPLASTIC RESIN
PARTS BY INJECTION MOULDING
Filed Nov. 13, 1970   6 Sheets-Sheet 5

United States Patent Office 3,702,750
Patented Nov. 14, 1972

3,702,750
MACHINE FOR FORMING THERMOPLASTIC RESIN PARTS BY INJECTION MOULDING
Giovanni Bessolo Veneria, Turin, Italy, assignor to Ing. C. Olivetti & C., S.p.A., Turin, Italy
Filed Nov. 13, 1970, Ser. No. 89,380
Claims priority, application Italy, Nov. 14, 1969, 54,028/69
Int. Cl. B29c 9/00
U.S. Cl. 425—130
9 Claims

ABSTRACT OF THE DISCLOSURE

A machine and method for injection molding thermoplastic resin parts having a mold and transfer plate means mounted to transfer parts from the mold to a part separation station where at ejection means separate the parts from the plate means simultaneously with injection of resin into the mold. The method and machine further contemplates part molding in two or more colors where a partially finished product is molded at one station, a modified product is molded at a second station, the modified product ejected at a part separation station and transfer to a succeeding station of each part is effected in between simultaneous injection of resin at the first and second stations and ejecting the part from the part separation station.

---

The present invention relates to a machine for injection moulding thermoplastic resin parts or pieces comprising at least one mould into which a resin is injected to form simultaneously a series of parts, in particular a series of keys.

These parts are generally formed by injection through a single nozzle and remain attached to one another through the sprue, which is generally detached later on. The parts separated in this way are then collected in a container and subsequently selected by hand.

For moulding parts in thermoplastic resins in two or more colours, comprising portions of different colours, the various portions are normally moulded in succession, each on a partly-finished product formed in a preceding moulding operation, so as to leave predetermined zones of these portions visible in the finished part or piece. In the case where the part is constituted by only two portions of different colours, the inner portion of the part is moulded in a first mould unit and with a first resin and, thereafter, the outer portion of the part is moulded over the first-mentioned portion in a second mould unit and with a second resin in such manner as to leave a predetermined zone of the first portion uncovered.

Machines for effecting the moulding of parts or pieces in thermoplastic resins in two or more different colours are known. The machines of the aforesaid type normally comprise a first mould in which a first portion of the part is formed by means of a first thermoplastic resin, and a second mould prearranged to contain such portion and allow the formation of another portion over or on the preceding one with a second thermoplastic resin; if the machine is designed to mould parts with more than two colours, additional moulds are provided into each of which a fresh material is injected over or onto the partly-finished product already formed in a preceding mould. The moulding of the various materials takes place simultaneously in the various moulds and with each of these moulds there co-operate plungers movable axially with respect to the moulds themselves and means are provided for transferring the partly-finished products from each mould to the following one.

In these machines, means independent of the transfer means are used for ejecting the sprues from the machine, so that while the machine described operates satisfactorily as a whole it is not entirely devoid of drawbacks. In fact, the time required for a moulding cycle is not very short, both because the ejection of the part from the machine is effected after the stage of injection of the plastics materials and not already simultaneously therewith, and because particularly long strokes are required for the purposes of ejection.

Finally, the ejection of the sprue requires the use of a third plate having a relative movement with respect to the moulds, which plate obviously further complicates the machine.

According to the present invention, a machine for forming thermoplastic resin parts by injection moulding is provided which enables the above-mentioned drawbacks to be eliminated.

According to the present invention there is provided a machine for forming thermoplastic resin parts by injection moulding comprising at least one mould into which a resin is injected to form simultaneously a series of separate parts, characterised by the fact that a plate movable axially with respect to the mould is moreover movable for effecting the transfer of the parts from the mould to a position in which they are separated from the plate and discharged from the machine into a series of ducts corresponding to the individual parts in said series by ejection means acting simultaneously with the injection of said thermoplastic resin into the mould.

For a better understanding of the present invention, a description of a particular embodiment thereof will now be given by way of example with reference to the accompanying drawings, in which.

The embodiment of the machine which is described and illustrated is designed for moulding two-coloured keys; it is obvious, as will become clearer hereinafter, that this machine can also be used for moulding any part or piece consisting of two materials of different colours. Moreover, by adding further moulding stations, the machine can mould parts having several colours.

Figure 1:
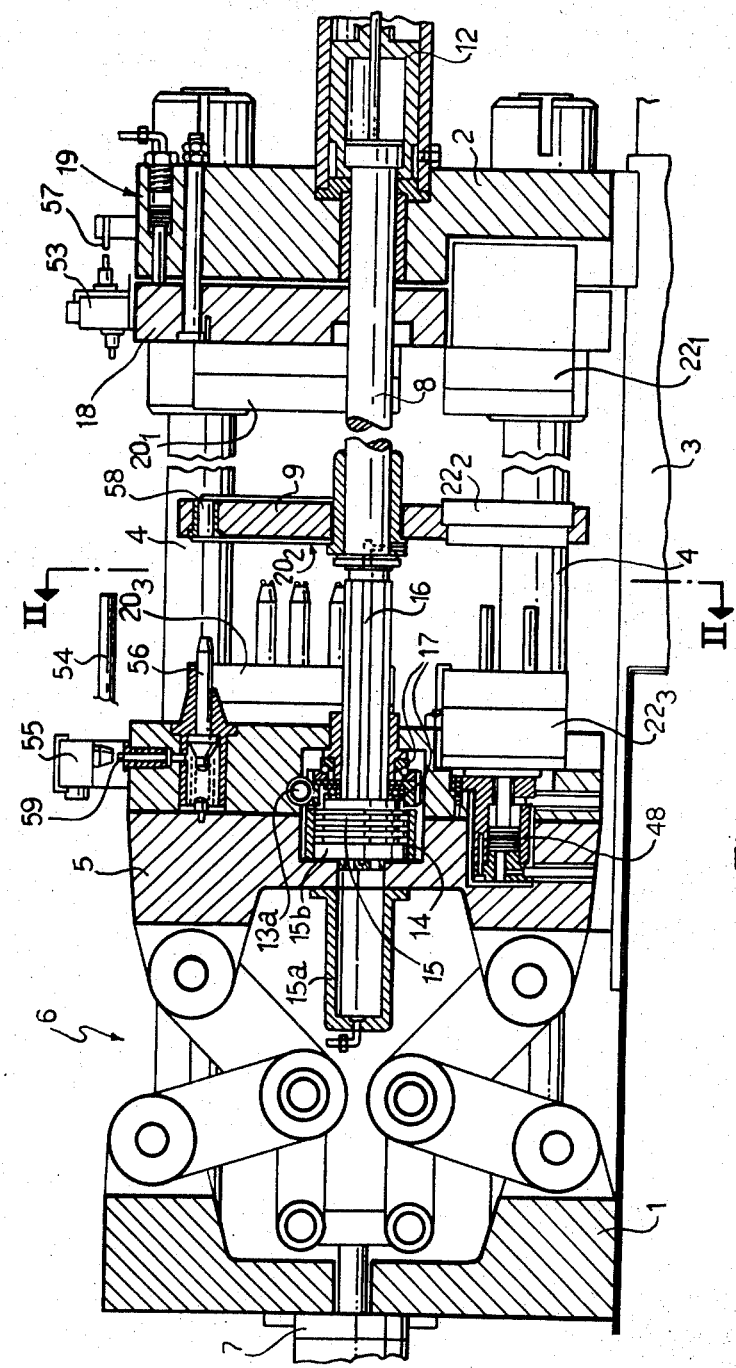
FIG. 1 is a longitudinal section of an embodiment of the machine of the invention suitable for moulding two-coloured keys.
Figure 2:
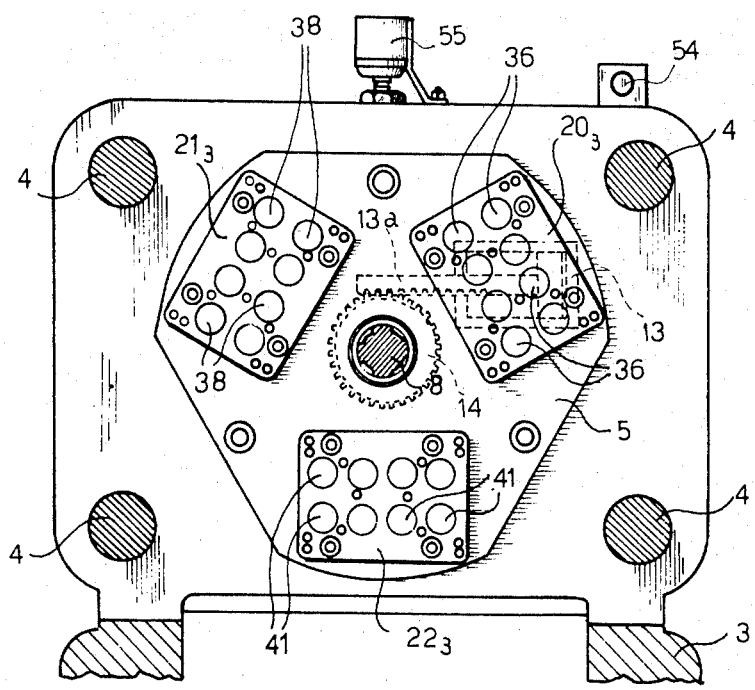
FIG. 2 is a section of the machine of FIG. 1 taken on the plane of the line II—II.

Referring to FIGS. 1 and 2, the machine according to the invention has substantially the characteristic structure of machines for injection moulding thermoplastic materials and includes a pair of fixed end plates 1 and 2 fast with the bed 3 and connected by columns 4 on which a movable plate 5 can slide. From the open position shown in FIG. 1, this plate can be brought into the closed position (by a movement to the right in the same drawing) by means of a toggle mechanism 6 of conventional type actuated by a hydraulic cylinder 7.

In the central portion of the plates 1 and 2 there is disposed a shaft 8 which is able to rotate and perform axial movements and to which an intermediate plate 9 is fixed. The axial movement of the shaft 8 (and, therefore, of the plate 9) is controlled by a hydraulic cylinder 12 the piston of which is fast with the shaft itself. In the position shown in FIG. 1, the plate 9 is in its end-of-stroke position to the left, at the maximum distance from the fixed plate 2, against which it can also be brought in the manner which will be described hereinafter. The rotation of the shaft 8 through a desired angle is controlled by a hydraulic cylinder 13 (FIG. 2) which can move a piston having a rod $13a$ (FIGS. 1 and 2) fast therewith substantially in a direction perpendicular to that of the plane of the section of FIG. 1. The terminal portion of the rod $13a$ is provided with a rack the teeth of which mesh with the teeth formed on the peripheral portion of a sleeve 14 arranged to carry along in rotation, through a friction clutch 15, a splined part 16 of the shaft 8. The clutch 15 is arranged to be closed or engaged intermittently between one injection and another so that the sleeve 14 (FIG. 1) is fast with the shaft 8 when the rod $13a$ shifts, for example, to the left in FIG. 8, while when it shifts in the opposite direction the sleeve 14 rotates idly with respect to said shaft. This intermittent closing and opening of the clutch 15 can be obtained, for example, by delivering oil under pressure to a chamber $15a$ disposed laterally of the clutch itself and partly closed by the end face of a disc $15b$ of the clutch. The intermittent rotation of the shaft 8 in a predetermined direction can also be obtained by means of an overriding clutch (or freewheel) which forms part of the clutch 15 and is arranged to cause the shaft itself to rotate fast with the sleeve 14 when this is caused to rotate in a predetermined direction (anticlockwise in FIG. 2) and to cause the sleeve to rotate idly with respect to the shaft itself when the direction of rotation of the sleeve is reversed. It is obvious, however, that for controlling the rotation of the shaft 8 it is possible to choose any suitable transmission whatsoever which enables a rotary movement of the shaft 8 to be derived from the axial movement of the rod $13a$.

To the fixed plate 2 there is moreover connected a plate 18 able to perform small axial movements with respect to the first-mentioned plate in consequence of the actuation of hydraulic cylinders 19 housed within said fixed plate.

Figure 3:
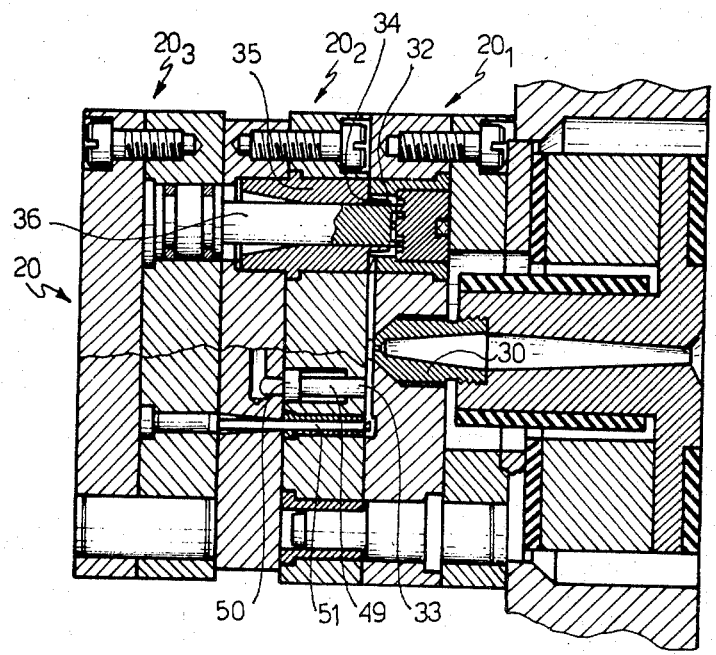
FIG. 3 is a section of the moulding unit forming the key cores in the machine of FIG. 1 in the closed position.
Figure 4:
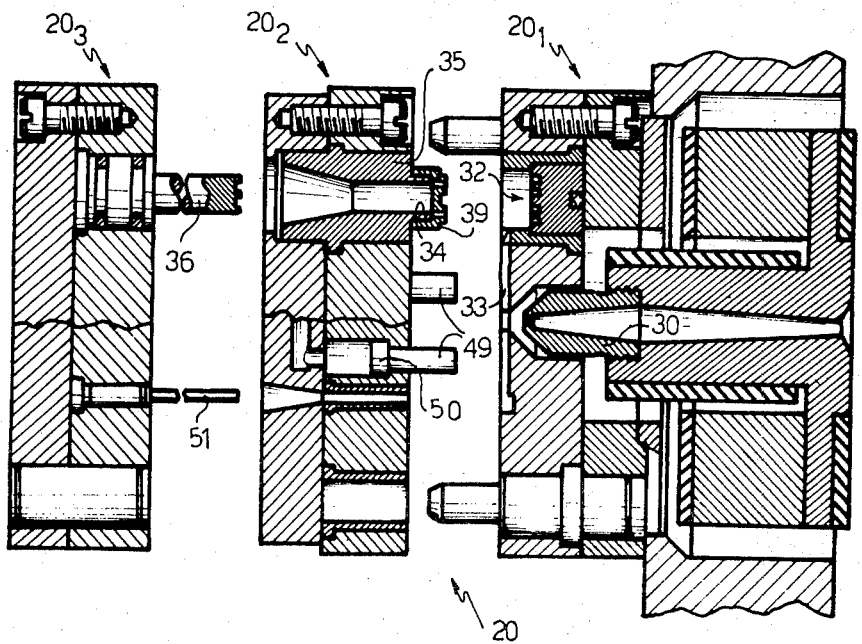
FIG. 4 is a section of the core forming mould unit of FIG. 3 in the fully open position.
Figure 5:
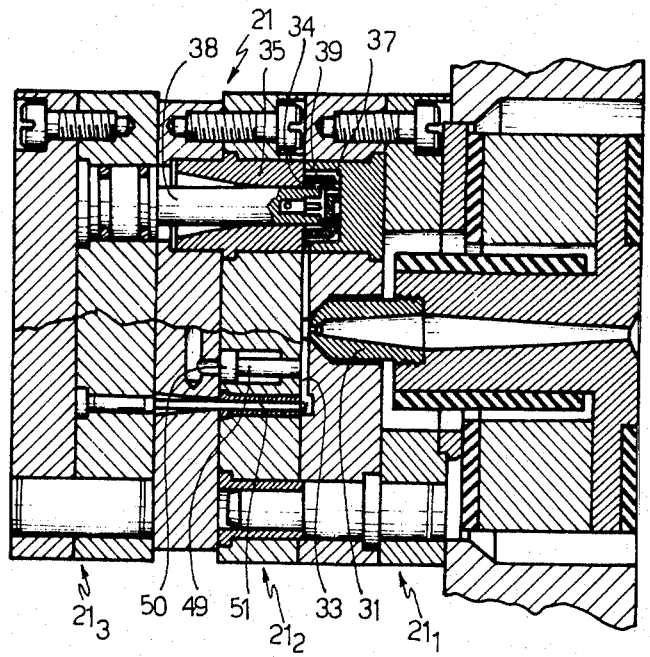
FIG. 5 shows the key forming mould unit of the machine of FIG. 1 in the closed position.
Figure 6:
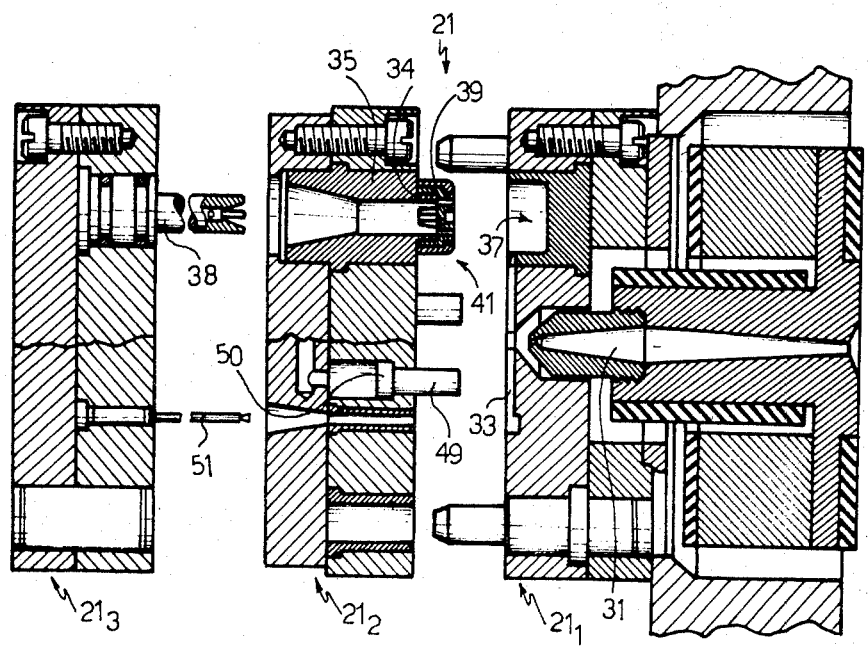
FIG. 6 is a section of the key forming mould unit of FIG. 5 in the fully open position.
Figure 7:
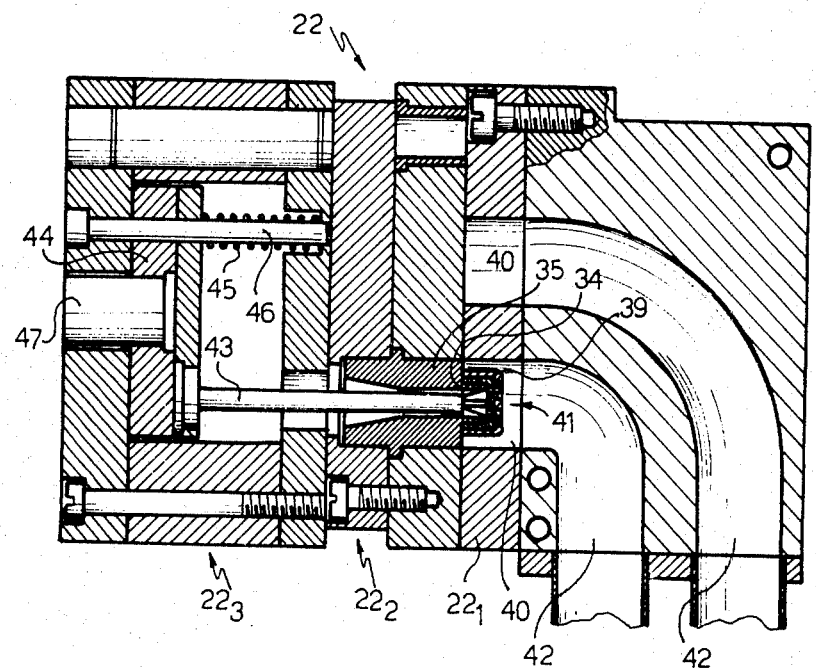
FIG. 7 is a section of the key ejecting device of the machine of FIG. 1 in the closed position.
Figure 8:
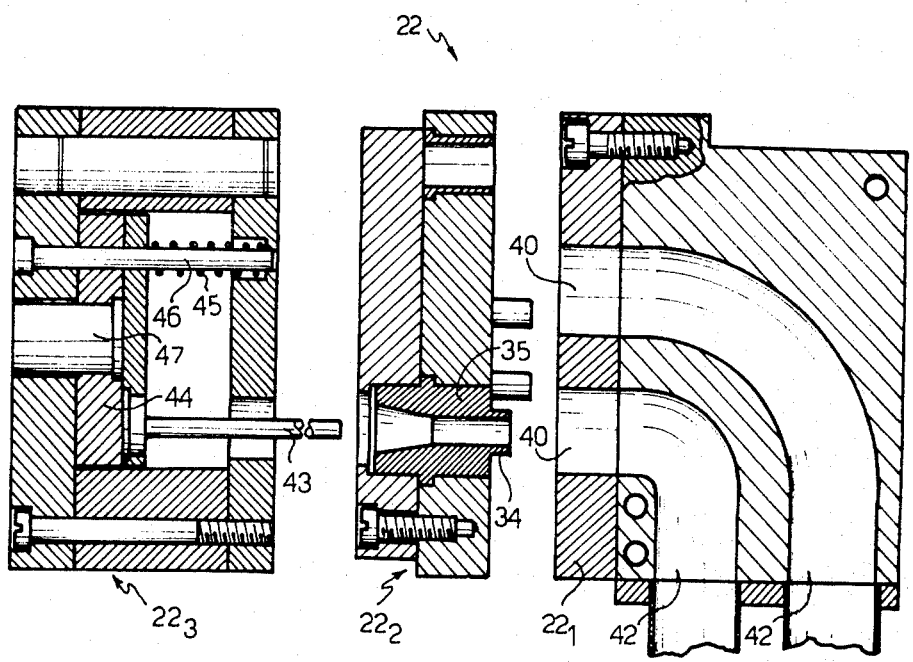
FIG. 8 shows the key ejecting device of FIG. 7 in the fully open position.

The machine of the invention shown in FIGS. 1 and 2 is equipped with two mould units, one 20 for forming the key cores (FIGS. 3, 4 and 9), one 21 for forming the keys (FIGS. 5, 6 and 10), and with a key ejecting device 22 (FIGS. 7 and 8). Each of said mould units and this device is constituted by a fixed plate $20_1$, $21_1$ and $22_1$, respectively (FIGS. 3, 5 and 7), fast with the plate 18 of the machine (FIG. 1), an axially movable plate $20_3$, $21_3$ and $22_3$, respectively, fast with the movable plate 5 of the machine, and an axially movable and swinging plate $20_2$, $21_2$ and $22_2$ (FIGS. 3, 5 and 7) fast with the intermediate plate 9 of the machine. The fixed plates $20_1$, $21_1$ and $22_1$ and the axially movable plates $20_3$, $21_3$ and $22_3$ are disposed on the machine substantially at 120° from one another (FIG. 2) and each of the mould units has eight "locations" arranged in two parallel rows. In FIGS. 3, 5 and 7, the plates forming both the mould units and the device are shown in contact with one another (closed position of the mould units and the device), while in FIGS. 4, 6 and 8 they are separated (open position of the mould units and the device).

Into the fixed plates $20_1$, $21_1$ of the mould units there extend nozzles 30 and 31 (FIGS. 3 and 5) for respectively injecting a first thermoplastic material with which the key cores are formed and a second thermoplastic material with which the remaining portions of the keys are formed on the cores.

In the plate $20_1$ of the mould unit forming the cores (FIGS. 3 and 4) there is formed a plurality of cavities 32 each of which defines the mould for a core which, as is known, bears in relief the characters which are to be visible in the finished key. Each mould is placed in communication with the terminal portion of the injection nozzle 30 by channels 33 formed in said fixed plate $20_1$. The inner lateral surface of the cores is defined by the outer surface of an annular projection 34 of a sleeve 35 fast with the plate $20_2$, while plungers 36 inserted into the sleeves and fast with the movable plate $20_3$ define the remaining portion of the inner surface of the cores.

The key forming mould unit (FIGS. 5 and 6) has substantially the same structure as the core forming mould unit, with the difference that the mould cavities 37 in the plate $21_1$ and the terminal portions of plungers 38 fixed to the plate $21_3$ have forms such as to define the top and outer lateral surface and the bottom surface, respectively, of the key itself, which are obviously different from the corresponding surfaces of the core. In the cavities 37 are cores 39 supported by the same annular projections 34 of the sleeves 35 on which they were initially moulded in the mould unit 20 before being transferred to the mould unit 21.

The key ejecting device 22 (FIGS. 7 and 8) has its fixed plate $22_1$ provided with holes 40, one in correspondence with each of the keys 41, which are still supported by the annular projections 34 of the sleeves 35 and are transferred to said device from the mould unit 21. Each hole 40 is in correspondence with a duct or channel 42, the channels conveying the keys to suitable containers. To the plate $22_2$ there are moreover connected ejector plungers 43 arranged to pass inside the holes of the sleeves 35 previously occupied by the plungers 36 and 38 in the mould units 20 and 21. The plungers 43 are fast with a plate 44 which is mounted resiliently with respect to the plate $22_3$ by means of springs 45 and guided with respect to the latter plate by posts 46 and which is controlled by means of a rod 47 by a hydraulic cylinder 48 (FIG. 1) housed inside the movable plate 5.

Each of the three plates forming the two mould units and the device which have been described is constituted in reality by a plurality of separate parts or plates held together in various ways by typical methods conventionally employed in the construction of mould units for injection moulding with thermoplastics.

In correspondence approximately with the central portion of the movable plates $20_2$ and $21_2$ (FIGS. 3, 4, 5 and 6) of the mould units 20 and 21 there are arranged sprue ejectors 49 in communication with a corresponding chamber 50 to the interior of which a suitable fluid under pressure can be delievered. Plungers or pins 51 carried by the movable plates $20_3$ and $21_3$ of the mould units extend through a corresponding hole formed in the movable plates $20_2$ and $21_2$ and have free ends with an undercut portion (in the case shown in the drawing in the form of a truncated cone with the larger base facing the fixed plate of each mould unit) designed to be embedded, as will be seen hereinafter, within the sprues during the moulding stage.

The machine according to the invention operates in the following manner.

Let it be assumed that we are examining the operation of the machine starting from the position in which the two mould units and the device with which the machine is equipped are closed. The movable plate 5 and the intermediate plate 9 are therefore in their end-of-stroke position to the right in FIG. 1 and the various plates of the mold units and of the device assume the relative position shown in FIGS. 3, 5 and 7. Let it be assumed, moreover, that we are examining normal working and that, therefore, the cores 39 are in the cavities 37 (FIGS. 5 and 6) of the key forming mould unit 21 and the keys 41 are inside the holes 40 of the ejection device 22 (FIGS. 7 and 8). Both the cores 39 and the keys 41 have been previously transferred to the mould unit 21 and the device 22, respectively, in the manner which will be described hereinafter. In this closed state of the mould units and the device, the injection takes place simultaneously through the injection nozzles 30 and 31, respectively, into the cavities 32 of the core forming mould unit 20, with a first thermoplastic material, and into the cavities 37 of the key forming mould unit 21, over the cores 39 disposed inside these cavities, with a second thermoplastic material. From the passages inside the injection nozzles 30 and 31, the material reaches each of the cavities 32 and 37, respectively, through the channels 33, laterally with respect to the cavities themselves.

While the injection of the material into the mould units 20 and 21 is taking place, the hydraulic cylinder 48 (FIG. 1) is actuated and causes the rod 47 (FIGS. 7 and 8) of the ejection device 22 to shift. The plate 44 moves upwardly in FIG. 7 in opposition to the springs 45 and the plungers 43 exert a thrust under each of the keys 41, causing the removal thereof from the corresponding annular projections 34 and making them drop into the holes 40 and the ducts 42, from which they are delivered to suitable containers.

At this point the opening of the machine begins; oil under pressure is delivered to the hydraulic cylinders 7 and 12 and the intermediate plate 9 and the movable plate 5 separate themselves from the plate 18 and, during this first stage of the movement, the movable plates $20_2$, $21_2$ and $22_2$ of the mould units 20, 21 and the device 22, which plates are fast with the intermediate plate 9, remain constantly in contact with the movable plates $20_3$, $21_3$ and $22_3$ of the mould units, which latter plates, on the other hand, are fast with the movable plate 5. During this stage, both the cores 39 and the keys 41 remain attached to the annular projections 34 of the sleeves 35, while they are extracted from the corresponding cavities 32 and 37 of the mould units. The positions assumed by the two mould units at the end of this movement are shown in FIGS. 9 and 10, respectively.

Figure 9:
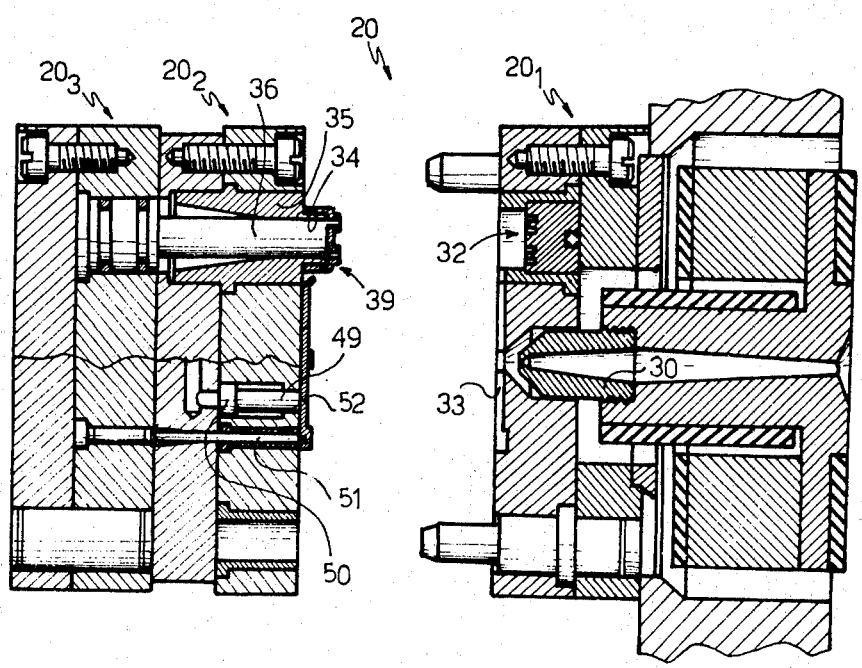
FIG. 9 is a section of the core forming mould unit of FIG. 4 in an intermediate open position before reaching the fully open position of FIG. 4.
Figure 10:
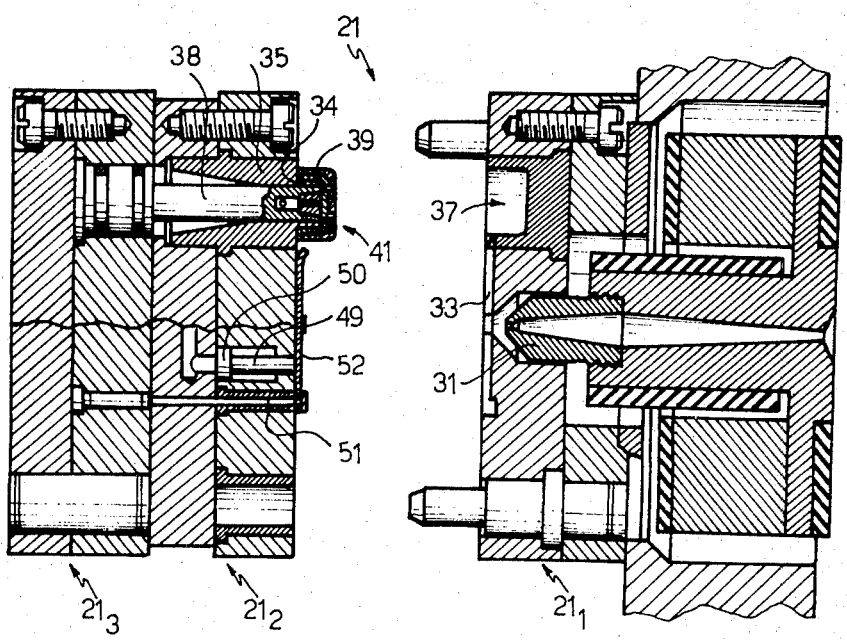
FIG. 10 is a section of the key forming mould unit of FIG. 5 in an intermediate open position before reaching the fully open position of FIG. 6.

The sprues 52 (FIGS. 9 and 10 which were previously occupying the channels 33 are extracted therefrom because of the undercut portions of the plungers 51. At the beginning of said opening movement of the machine, the connection between the cores 39 and keys 41 and the material of the sprues 52 is broken, as is usual in many moulds for moulding thermoplastic materials.

When the intermediate plate 9 reaches the position shown in FIG. 1 it stops, while under the action of the hydraulic cylinder 7 the movement of the movable plate 5 to the left continues and said movable plate stops when it reaches its end-of-stroke position, corresponding to that shown in FIG. 1.

During the relative movement of the movable plate 5 with respect to the intermediate plate 9, the plungers 36 and 38 (FIGS. 4 and 6) of the mould units 20 and 21 clear the holes in the sleeves 35 and the plungers 51 (FIGS. 9 and 10) of the mould units are extracted from the sprues 52, which can drop as soon as the ejectors 49 are actuated by delivering fluid under pressure to the interior of the corresponding chambers 50. The fully open mould units 20 and 21 are shown in FIGS. 4 and 6. At this point of the cycle, the hydraulic cylinder 13 (FIG. 2) is actuated and produces the shifting (to the left in FIG. 2) of the rod $13a$ (FIGS. 1 and 2) which, by means of the rack $13b$ meshing with the teeth of the sleeve 14, carries the sleeve itself along in rotation, which sleeve controls, through the friction clutch 15, the rotation of the splined part 16 of the shaft 8 and, therefore, the rotation of the intermediate plate 9 through a predetermined angle. When the hydraulic cylinder 13 (FIG. 2) is actuated to shift the rod $13a$ in the aforesaid direction, fluid under pressure is simultaneously delivered to the chamber $15a$ (FIG. 1) and, acting on the disc $15b$, closes or engages the clutch 15, rendering the sleeve 14 fast with the shaft 16. On the other hand, when the rod $13a$ is shifted to the right in FIG. 2, the pressure in the chamber $15a$ (FIG. 1) is nullified and the sleeve 14 is therefore loose with respect to the shaft 16. In this way, intermittent rotation of the intermediate plate 9, always in the same direction, is obtained. The hydraulic cylinder 7 thereafter pushes the movable plate 5 to the right in FIG. 1 and, during its stroke or travel, this plate carries the intermediate plate 9 along in the same direction, bringing the plates of which the mould units and the ejection device are formed into their closed position shown in FIGS. 3, 5 and 7. In this way, in consequence of said rotation of the intermediate plate 9 and of its subsequent translation, the cores 39 are transferred from the mould unit 20 to the mould unit 21 and the keys 41 from this latter mould unit to the ejection device 22. At this point a fresh cycle of the whole arrangement corresponding to that described begins.

Suitably, but not necessarily, safety devices may be arranged on the machine of the invention illustrated in FIG. 1. One of these causes the machine to open if, on the closing of the mould units, the plates of which they are formed do not mate perfectly (for example, owing to the presence of a part between them). This device comprises two microswitches 53 (FIG. 1) arranged on opposite sides on the movable plate 18, the one on the left in FIG. 1 being arranged to co-operate with a first spindle 54 fast with the movable plate 5 and the one on the right being arranged to co-operate with a second spindle 57 fast with the fixed plate 2. If the three plates of the mould units and the device are in perfect contact, both switches 53 are closed, one by the spindle 57 (owing to the movement of the plate 18 to the right) and the other by the spindle 54. Under these conditions, the continuation of the cycle is made possible. If, on the other hand, said plates are not in perfect contact, only the switch 53 on the right in FIG. 1 is closed and, under these conditions, the opening of the plate 5 of the machine is commanded. During said opening stage, the plate 18 is brought back into its end-of-travel position to the left (FIG. 2) by the hydraulic cylinders 19.

Suitably, in order to obtain more precise rotation of the intermediate plate 9, there may be provided centering pins 56 (FIG. 1) able to co-operate with coresponding bushes 58 in the plate itself towards the end of the stage of closing of the machine.

The rear portion of the pins 56, co-operating through a push pin 59 with a microswitch 55, can cause this to close, thereby interrupting the cycle, if correct coupling of the pins 56 with the bushes in the intermediate plate 9 has not occurred.

It is clear that modifications and variations can be made in the described embodiment of the present invention, both in the form and in the arrangement of the various parts, without departing from the scope of the invention itself.

In particular, the machine of the invention can be used for moulding, instead of keys, two-coloured parts of two different materials, such as knobs, push buttons, containers or the like. In this case, the form of the cavities 32 and 37 of the mould units 20 and 21, respectively, and of the plungers 36, 38 and 43 must be different from the form illustrated.

Moreover, said machine can be used for moulding parts or pieces with more different colours. In this case, in addition to the mould units 20 (FIGS. 3, 4 and 9), 21 (FIGS. 5, 6 and 10), further mould units of the type of the mould unit 21 must be provided, into the interior of each of which a fresh material is injected, in a manner entirely similar to that described, over or onto a partly-finished product already formed in the preceding mould unit.

It is claimed:

1. A machine for simultaneously forming a series of individual parts by injection moulding of thermoplastic resin, comprising a die moulding plate provided with at least a first die for forming simultaneously a series of separate partly-finished products for said parts by injecting a first resin into said first die, said die holding plate further being provided with at least a second die arranged for receiving said partly-finished products from said first die and modifying said partly-finished products by injecting into said second die a second resin simultaneously with the injection of said first resin into said first die, a punch holding plate movable axially with respect to said die holding plate, a first series of punches mounted on said punch holding plate and in alignment with said first die, a second series of punches mounted on said punch holding plate and in alignment with said second die, axial movement of said die holding plate causing said punches to cooperate with the respective said dies, and a third plate rotatably and axially movable relative to both said die holding plate and said punch holding plate and transferring partly-finished products from said first die to said second die, wherein said improvement comprises:

a series of cavities provided on said die holding plate, said series of cavities being equally spaced from said two dies to form a part separation station, a series of discharge ducts corresponding to the individual parts in said series and in communication with said cavities, a series of ejector plungers carried by said punch holding plate and aligned with said cavities, and moving means for axially displacing said plungers relative to said die holding plate and said third plate, said third plate being rotatable step by step for transferring said parts from said second die to said separation station where said parts are separated from said third plate simultaneously with the injection of said resins in the corresponding said dies.

2. A machine according to claim 1, wherein said third plate is rotatable on a horizontal shaft, and further comprising annular projections provided on said third plate for supporting said parts and said partly-finished products during said transfer, said ejector plungers passing through said annular projections during removal of the parts.

3. A machine according to claim 1, wherein each of said dies has lateral openings for injecting the corresponding thermoplastic resin laterally with respect to said punches, and comprising a plurality of apertures on said third plate, one said aperture being brought each time into correspondence with each one of said dies, undercut means secured to said punch holding plate and passing through said apertures for retaining the sprues during axial movement of said third plate, and ejector elements provided on said third plate and axially movable with respect thereto for ejecting the sprues from the corresponding dies.

4. A machine according to claim 1, wherein said third plate is caused to rotate by rotating means comprising a clutch which is closed intermittently between one injection and the next and is controlled by a rack actuated with an alternate motion in the direction of advance of the plate when said clutch is closed and in the opposite direction when said clutch is opened.

5. A machine according to claim 4, wherein said third plate is mounted to rotate on a horizontal shaft, and said part separation station is located at the lowest portion circumferentially of said third plate, and said two dies are disposed above said lowest portion at 120° from one another.

6. A machine for forming a moulded article in a multistep moulding process comprising:

a fixed die holding plate having a first moulding station, a second moulding station, and an ejection station, said stations being radially oriented about a station axis, a first die mounted at said first station for accomplishing a first moulding step, a second die mounted at said second station for accomplishing a second moulding step, an ejection opening at said ejection station, a movable punch holding plate in opposed relationship to said die holding plate, first and second forming punches carried by said punch holding plate, said punches being aligned respectively with said first and second dies, said punch holding plate being movable along said station axis between a moulding position wherein said dies and said punches cooperate to form moulds at said first and second stations and a transfer position wherein said punches are spaced from said dies, an ejection punch carried by said punch holding plate and aligned with said ejection station, a movable transfer plate interposed between said punch holding plate and said die holding plate for transferring the article being moulded between said stations, said transfer plate having article holding stations in alignment with each of said first and second moulding stations and said ejection station and being provided at each said article holding station with means for engaging and holding said article being moulded, said transfer plate further having at each article holding station a punch opening through which said punches extend when said punch holding plate is in said moulding position, said transfer plate being axially movable with respect to said station axis between a moulding position in juxtaposition to said die holding plate and a transfer position spaced from said die holding plate and from said punch holding plate with said punches withdrawn from said openings, means for moving said punch holding plate and said transfer plate axially, and means for rotating said transfer plate, whereby when said punch holding plate and said transfer plate are in said moulding positions a first moulding operation is performed in said first station on a first article while simultaneously a second moulding step is performed in said second station on a second article previously exposed to said first station, whereby during the course of movement of said punch holding plate and said transfer plate into said moulding positions a third article previously exposed to both said first and second stations is ejected from said machine at said ejection station by the action of said ejection plunger, and whereby when said plunger holding plate and said transfer plate are in said transfer positions said transfer plate is rotated to transfer said article being moulded to the next of said stations.

7. A machine according to claim 6 wherein said means for engaging and holding said article being moulded comprises an annular projection surrounding each said punch opening at each said article holding station.

8. A machine according to claim 6 wherein said means for rotating said transfer plate comprises a one-way clutch operated when said transfer plate is in said transfer position whereby said transfer plate rotates in only one direction.

9. A machine according to claim 6 wherein each of said dies has a lateral injection opening for injecting the material of which said article being moulded will be formed, wherein said transfer plate further comprises channels for conducting said material to said lateral openings, and said machine further comprises sprue ejection means for removing the sprues formed in said channels.

References Cited

UNITED STATES PATENTS

| | | | |
|---|---|---|---|
| 3,091,810 | 6/1963 | Turner | 18—20 H X |
| 3,407,443 | 10/1968 | Beebee et al. | 18—20 H X |
| 3,363,039 | 1/1963 | Nagai et al. | 18—42 D X |
| 2,330,369 | 9/1943 | Marsh | 18—42 D |
| 2,828,508 | 4/1958 | Labarre | 18—20 H X |

ROBERT L. SPICER, JR., Primary Examiner

U.S. Cl. X.R.

264—245; 425—250, 261, 246, 257